3,261,147
ARRANGEMENT FOR THE PURIFICATION OF AIR IN INSTALLATIONS FOR THE VENTILATION AND AIR CONDITIONING OF OPERATING THEATRES AND SIMILAR PREMISES
Claes Allander, Bromma, Sweden, assignor to Aktiebolaget Svenska Fläktfabriken, Stockholm, Sweden
Filed Oct. 4, 1962, Ser. No. 228,460
1 Claim. (Cl. 55—222)

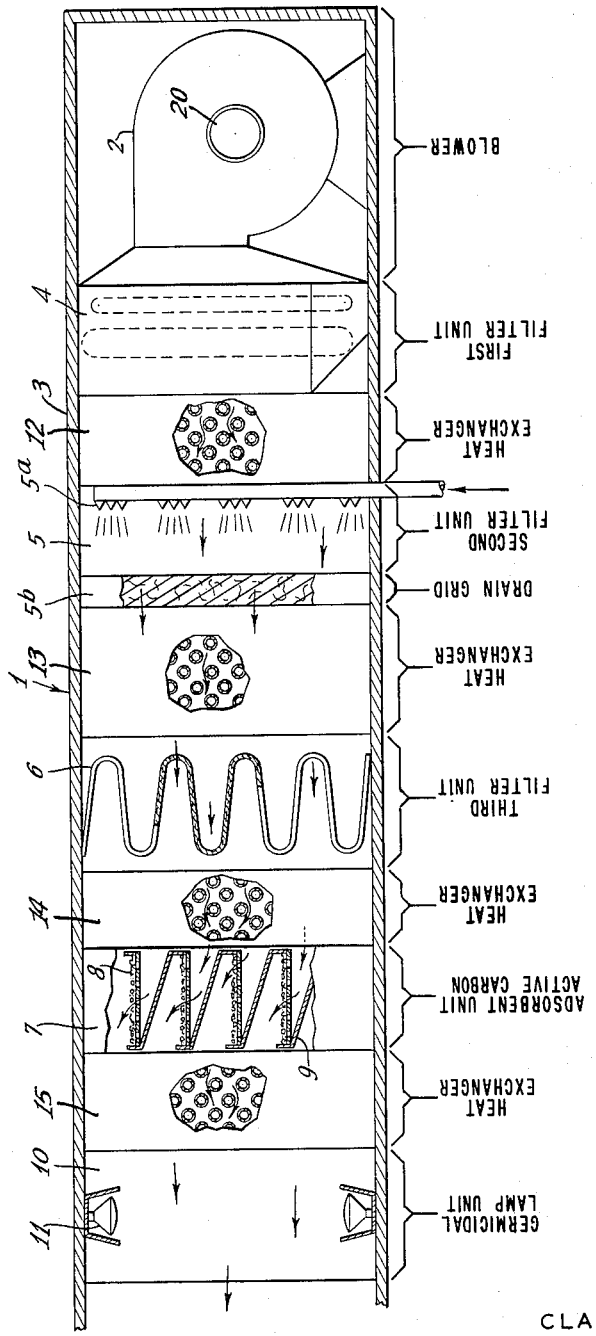

The present invention relates to air conditioning apparatus, particularly to an arrangement for the purification of air in installations for the ventilation and air-conditioning of operating rooms or theatres and similar premises where there is a considerable demand for conditioned air by the supply of air treated in a conditioning apparatus. The arrangement according to the invention is characterized in that the air is filtered in several successive steps, relatively large sized dust particles being separated in the first step, and particles smaller than those separated in the first step, being separated in the second step whilst in the third step remaining particles of the smallest size are separated. This arrangement makes it possible to meet to a higher degree than in the case of earlier designs the now ever increasing demand for highly conditioned air when air-conditioning operating theatres and similar premises. This is achieved by obtaining the highest possible effect of separation for each filter unit operating with a determined fraction of particle size. In addition the filter units, especially the end filter, have a longer life thus reducing the running cost of the installation because of longer intervals between the necessary filter changes and a reduced service. The inconveniences and risks will also be less in case filter changes should be forgotten.

According to a suitable embodiment of the invention the first step of the arrangement consists of a dry or so-called oil-wetted filter and the second step consists of a washer in which the air is brought into close contact with a finely distributed fluid spray or mist and, according to this embodiment, the third step consists of a dry filter, preferably of the so-called throw-away or disposable type. For the purpose of further purification and the destruction of air-borne bacteria the installation can be provided with a zone with bacteria killing radiation. In order to destroy impurities remaining in the air, the air after the aforesaid treatments can be conducted through a bed of adsorbing material in cases where the impurities have not been completely eliminated by the above mentioned washer. In order to give it bacteria killing effect the washing process can be carried out with lithium-chloride or a similar bacteria killing fluid.

The invention will now be described more in detail with reference to the accompanying drawing showing by way of example an installation to purify air in accordance with the invention.

In the drawing 1 indicates an air conditioning apparatus consisting of a fan 2, in this case a centrifugal fan having an inlet 20, connected with a casing 3 containing a number of filter units. According to the invention the air is purified in the first step by a filter separating dust particles of relatively large size, which filter in this case represents an oil-wetted filter 4 of conventional design. Designation number 5 stands for a washer forming the second step of the purification and consisting of a bank of nozzles 5a and a water draining grid or screen 5b. Here bacteria-killing material, such as lithium chloride, is preferably added. Designation number 6 indicates a conventional dry filter preferably of the so-called throw-away or disposable type. A filter section 7 to separate impurities remaining in the air being treated, consists of a number of net frames 8 disposed one above the other and containing a bed of adsorbing material, e.g. active carbon and separated by means of obliquely placed dividing walls 9. Designation number 10 indicates a zone equipped with lamps 11 emitting bacteria killing radiation. The spaces between the units are provided with heat exchange means designated by the numerals 12, 13, 14 and 15 from right to left for the necessary heating or cooling of the air being treated.

What I claim is:

Apparatus for conditioning contaminated air containing dust particles of mixed sizes and bacteria, said apparatus comprising a horizontally elongated conduit having an inlet means at one end and an outlet means at the other end thereof for allowing ingress and egress, respectively, of air into and out of said conduit, a fan disposed in said conduit and adjacent said inlet means, said fan being constructed and arranged so that all air entering said conduit must pass through said fan, an oil-wetted filter disposed within said conduit, said oil-wetted filter being constructed and arranged to block passage of a dust particle fracttion above a predetermined particle size while passing the remaining fraction of said dust particles through said oil-wetted filter, a first heat exchanger disposed within said conduit and downstream of said oil-wetted filter, a plurality of spray nozzles disposed within said conduit and extending transversely across said conduit and downstream of said first heat exchanger, said spray nozzles being connected to a source of lithium chloride solution to produce a bacteria killing effect in the spray, a liquid draining grid disposed in said conduit and downstream of said spray nozzles, said grid being so constructed and arranged that it blocks passage of a second dust particle fraction above a second predetermined particle size smaller than said first named fraction while passing the remaining fraction of said dust particles through said grid, a second heat exchanger disposed within said conduit and downstream of said grid, a dry filter of the zig-zag throw-away type disposed within said conduit and downstream of said second heat exchanger, said dry filter being constructed and arranged so that substantially the remaining fraction of said dust particles will not pass therethrough, a third heat exchanger disposed within said conduit and downstream of said dry filter, an active carbon filter disposed within said conduit and downstream of said third heat exchanger, a fourth heat exchanger disposed within said conduit and downstream of said active carbon filter, and lamps which emit bacteria-killing radiation disposed within said conduit and downstream of said fourth heat exchanger; said oil-wetted filter, said grid, said dry filter and said active carbon filter each extending transversely across said conduit and all points of the outer periphery of each contacting the inner periphery of said conduit.

(References on following page)

References Cited by the Examiner

UNITED STATES PATENTS

| | | | |
|---|---|---|---|
| 259,722 | 6/1882 | Stratford | 55—279 X |
| 949,032 | 2/1910 | Ernsberger | 55—279 X |
| 1,409,364 | 3/1922 | Dobbs et al. | 55—279 X |
| 1,815,306 | 7/1931 | Lawrence | 55—259 X |
| 1,838,512 | 12/1931 | Wilson | 55—279 X |
| 1,922,416 | 8/1933 | Block | 55—279 X |
| 2,043,217 | 6/1936 | Yaglou | 21—53 X |
| 2,114,787 | 4/1938 | Smith. | |
| 2,146,071 | 2/1939 | Horvath | 55—527 X |
| 2,186,125 | 1/1940 | Roberts | 55—440 X |
| 2,197,004 | 4/1940 | Myers | 55—259 |
| 2,205,831 | 6/1940 | Hartman | 7—1940 |
| 2,209,054 | 8/1940 | Doud et al. | 55—279 X |
| 2,211,468 | 8/1940 | Marsh | 55—279 |
| 2,262,542 | 11/1941 | Bahnson | 55—419 X |
| 2,418,339 | 4/1947 | Ehrgott | 55—279 X |
| 2,514,720 | 7/1950 | Rennels | 55—279 X |
| 2,628,083 | 2/1953 | Rense | 55—279 X |
| 2,631,688 | 3/1953 | Osborne et al. | 55—279 X |
| 2,638,644 | 5/1953 | Rauhut | 55—279 X |
| 2,825,680 | 3/1958 | Stutz | 55—258 X |
| 3,134,825 | 5/1964 | Sexton | 55—259 X |

FOREIGN PATENTS

| | | |
|---|---|---|
| 29,704 | 8/1907 | Austria. |
| 587,316 | 4/1924 | France. |
| 473,144 | 10/1937 | Great Britain. |

HARRY B. THORNTON, *Primary Examiner.*

ROBERT F. BURNETT, *Examiner.*

D. E. TALBERT, *Assistant Examiner.*